US006627881B1

(12) United States Patent
Bertrand et al.

(10) Patent No.: US 6,627,881 B1
(45) Date of Patent: Sep. 30, 2003

(54) TIME-OF-FLIGHT BACTERIA ANALYSER USING METASTABLE SOURCE IONIZATION

(75) Inventors: Michel J. Bertrand, Verdun (CA); Olivier Peraldi, Montréal (CA)

(73) Assignees: Dephy Technolgies Inc., Montreal (CA); Université de Montréal, Montreal (CA)

( * ) Notice: Subject to any disclaimer, the term of this patent is extended or adjusted under 35 U.S.C. 154(b) by 78 days.

(21) Appl. No.: 09/722,612

(22) Filed: Nov. 28, 2000

(51) Int. Cl.[7] ........................................ B01D 44/00
(52) U.S. Cl. ................ 250/288; 315/111.91; 313/359.1
(58) Field of Search ................................ 250/281, 282, 250/287, 288, 423 P, 423 R; 219/121 P, 74, 75; 315/111.41, 111.91, 111.81, 111.21, 111.71

(56) References Cited

U.S. PATENT DOCUMENTS

| | | | | |
|---|---|---|---|---|
| 4,251,725 A | * | 2/1981 | Adkisson | 250/281 |
| 4,546,253 A | * | 10/1985 | Tsuchiya et al. | 250/288 |
| 5,485,016 A | | 1/1996 | Irie et al. | |
| 6,057,543 A | * | 5/2000 | Vestal et al. | 250/282 |

OTHER PUBLICATIONS

Curie–Point Pyrolysis Mass Spectrometry as a Tool in Clinical Microbiology by Goodfellow et al., Zbl Bakt. 285, pp. 133–156 (1977).

Chemical Marker for the Differentiation of Group A and Group B Streptococci by Pyrolysis–Gas Chromatography–Mass Spectrometry, by Cynthia S. Smith et al, Anal. Chem 1987, 59, pp. 1410–1413.

Gas Chromatography–Mass Spectometry Studies on the Occurence of Acetamide, Propionamide, and Furfuryl Alcohol in Pyrolyzates of Bacteria, Bacterial Fractions, and Model Compounds, by Larry W. Eudy et al., Journal of Analytical and Applied Pyrolysis, 7 (1985) pp. 231–247.

Capillary Gas Chromatography–Mass Spectrometry of Carbohydrate Components of Legionellae and Other Bacteria, by Michael D. Walla et al., Journal of Chromatography, 288 (1984) pp. 399–413.

Chematoxonomic Studies of Some Gram Negative Bacteria by means of Pyrolysis–Gas–Liquid Chromatography, by Reiner et al., NATURE, vol. 217, Jan. 13, 1968, pp. 399–413.

Effect of Different Growth Conditions on the Discrimination of Three Bacteria by Pyrolysis Gas–Liquid Chromatography, by Gutteridge et al., Applied and Envidonmental Microbiology, Sep. 1980, vol. 40, pp–462–465.

Pyrolysis–Gas Chromatography Combined with SIMCA Pattern Recognition for Classification of Fruit–bodies of Some Ectomycorrhizal *Suillus* Species by Söderström et al., Journal of General Microbiology (1982), 128, pp–1773–1784.

(List continued on next page.)

*Primary Examiner*—John R. Lee
*Assistant Examiner*—Phillip A Johnston
(74) *Attorney, Agent, or Firm*—Ogilvy Renault; James Anglehart

(57) ABSTRACT

For analyzing micro-organisms and other high-molecular weight species, a sample of the substance to be analyzed is prepared, placed in a pyrolyzer where it is pyrolyzed with a selected temperature program to provide pyrolyzed product of a high-dalton mass range. The product is ionized using metastable atoms which results in efficient ionization with little fragmentation. The metastable atoms are generated using a generator that provides a beam of metastable atoms which is basically free from ions. The ionized product is then analyzed using a high acquisition rate mass analyzer, such as a time-of-flight (TOF) analyzer.

16 Claims, 6 Drawing Sheets

OTHER PUBLICATIONS

The Analysis of Bioploymers by Analytical Pyrolysis Gas Chromatograpjy, by Forrest L. Bayer et al., Biopolymers in Analytical PGC, pp. 277–337.

Pyrolysis Mass Spectrometry of Recent and Fossil Biomaterials, Compendium and Atlas, by Meuzelaar et al. pp. 89–123.

Analytical Pyrolysis—An Overview by W.J. Irwin, Journal of Analytical and Applied Pyrolysis, 1 (1979) pp–89–122.

Matrix–Assisted Laser Desorption/Ionization Mass Spectrometry of Biopolymers, by Frazx Hillenkamp et al., Analytical Chemistry, vol. 63, No. 24, Dec. 15, 1991, pp–1193 A–1202 A.

Differentiation of Microorganisms Based on Pyrolysis–Ion Trap Mass Spectrometry Using Chemical Ionization, by Barshick et al., Analytical Chemistry, vol. 71, No. 3, Feb. 1, 1999, pp. 633–641.

* cited by examiner

TIME-OF-FLIGHT BACTERIA ANALYSER USING METASTABLE SOURCE IONIZATION

CROSS-REFERENCE TO RELATED APPLICATIONS

The present application is related to commonly-assigned U.S. Pat. No. 6,124,675 (corresponding to PCT publication WO 99/63577), the specification of which is hereby incorporated by reference.

FIELD OF THE INVENTION

The present invention relates to a bacteria analyzer, and in particular to a time-of-flight bacteria analyzer using metastable atom bombardment ionization source.

BACKGROUND TO THE INVENTION

There are presently many problems related to micro-organisms, and their rapid detection and identification is of great importance. For example, bacteria, like fungi, are involved in many human infections and it is important in clinical environments to be able to detect these organisms. In the food industry, genetically modified organisms (GMO's) are of interest and it would be desirable to easily detect them for control purposes.

Presently, there are biological methods that can be used to identify micro-organisms but their use requires time (up to several days) which is not always desirable. For example, in clinical environments, because of the time required to get a result, physicians will often prescribe a wide-spectrum antibiotic to a patient to be on the safe side, or alternatively risk a patient's well-being and comfort by delaying use of the correct specific antibiotic until after lab tests have identified the micro-organism source of infection. In a majority of cases, the results will come back negative and this leads to an overuse of these broad-spectrum drugs. As a consequence, the price of health care is higher, and this practice is also in part responsible for the Methods usually available for the identification of micro-organisms are based on biological processes (genotyping) and rely on amplification methods (PCR, culture, etc.). The amplification step is often the time limiting factor in obtaining a result.

Detection and identification of micro-organisms by physical processes can be done rapidly and several approaches have been described (Goodfellow M., Freeman R. and Sisson P. R., Zbl. Bakt. (1997) 285, 133–156). These approaches generally make use of analytical techniques such as gas-chromatography (GC) or mass spectrometry (MS). They usually involve a thermal process such as rapid heating of the sample to a high temperature (pyrolysis) (Fox A. and Morgan S. L., In: Rapid Detection, and Identification of Microorganisms (Nelson, W. H., ed.) pp 135–164. Vch Publishing, Deerfield, Fla., USA, 1985; Smith C. S., Morgan S. L., Parks C. D., and Pritchard D. G., Anal. Chem., (1987) 59, 1410–1413; Euly, L. W., Walla M. D., Hudson J. R., Morgan S. L., and Fox A., J. Anal. Appl. Pyrol. (1985) 7, 231–247; Walla M. D., Morgan P. Y., Fox A., and Brown A., J. Chromatog. (1984) 288, 399–413; Reiner E., and Ewing W. H., Nature (1968) 217, 191–194; Gutteridge C. S. and Norris, J. R., Appl. Environ. Microbiol., (1980) 40, 462–465; Soderstrom B., Wold S. and Blomquist G., J. Gen. Microbiol., (1982) 128, 1773–1784; Bayer F. L., and Morgan S. L., In: Pyrolysis and GC in Polymer Analysis (Liebman S. A. and Levy E. J., eds) pp. 277–337, Marcel Dekker, N.Y., USA, 1985; Meuzelaar H. L. C., Haverkamp J. and Hileman F. D., Pyrolysis Mass Spectrometry of Recent and Fossil Biomaterials, Elsevier, Amsterdam, 1982; Irwin W. J., J. Anal. Appl. Pyrol., (1979) 1, 89–122) or exposition of the sample to a laser beam (Hiilemkamp F., Karas M., Beavis R. C. and Chait B. T., Anal. Chem. (1991) 63, 1193A–1202A), e.g. matrix-assisted laser desorption/ionization (MALDI). In the pyrolysis approach, the micro-organism is rapidly heated, in the absence of oxygen, to a high temperature which leads to the thermal breakdown of the sample, thus generating secondary products that can be used as markers for identification of the micro-organisms. The decomposition products can be analyzed by gas-chromatography (as methyl esters of fatty acids) (Py-GC) or by mass spectrometry (Py-MS). When the sample is exposed to a laser beam (MALDI), the micro-organisms are deposited on a probe, under vacuum, and bombarded by a laser beam pulse of high energy. In Py-MS and MALDI, a mass spectrometer is used to analyze the decomposition products by monitoring mass spectra during the decomposition process. Both approaches have limitations, since in Py-MS techniques, variability due to the ionization technique can cause problems (generation of exportable libraries of micro-organism fingerprints) and in MALDI, the micro-organism has to be inserted into a solid matrix which reduces the universality of the process (different matrices have to be used for different micro-organisms) and reduces the detection limits.

Although Py-MS techniques have a potential to provide rapid answers to micro-organism detection and identification, they have been limited because of problems generated mainly by the ionization technique used in Py-MS. These problems stem from the fact that, in many cases, pyrolysis has to be conducted away from the ionization chamber and that the ionization process itself is not adequate leading to a loss of information and a complication of the mass spectra obtained during pyrolysis.

In many instances, pyrolysis of the sample (micro-organism or polymer) is conducted in a chamber remote from the ionization source and the decomposition products are carried to the ion source of the mass spectrometer by an inert carrier gas (usually Argon) through a capillary. The resulting effects of this approach are that compounds (radicals or molecules) issued from the primary process of pyrolysis are lost. For example, high molecular weight species that have a low vapor pressure can condense on the walls of the capillary and reactive species (radicals) can react at the walls or be recombined. In both of these cases, high molecular weight species are not monitored by the mass spectrometer and because they contain a high degree of information, specificity is lost.

The ionization process used in the mass spectrometer can play a key role in the detection and identification of the micro-organism. In early studies, electron ionization was used to ionize products generated during pyrolysis. This ionization technique leads to complex mass spectra containing mostly low molecular weight ions. The complexity of the mass spectra is due to the fact that electron ionization is a very energetic process that induces extensive fragmentation. Thus, fragments generated during pyrolysis are refragmented in the ion source of the mass spectrometer yielding a legion of ions most of which are at low masses. Because of this extensive fragmentation, high molecular weight species that contain specific information on the identity of the compound are destroyed and the information is lost. Attempts have been made to remedy this problem. An approach is to lower the electron energy, thus, reducing fragmentation upon ionization. However, lowering the electron energy significantly reduces sensitivity (by more than one hundred) and leads to irreproducible results because of the overwhelming effect of source tuning conditions at low energy. Hence, it becomes almost impossible to generate libraries of spectra of micro-organisms that can be exported to other laboratories.

Recent studies have been conducted to improve the Py-MS approach. In these studies, methylation is conducted during pyrolysis and ionization is achieved with chemical ionization. The methylation step aims at increasing the volatility of the compounds formed during pyrolysis, thus, increasing their chance of reaching the ion source and being ionized. Combined with the methylation step, chemical ionization (Barshick S. A., Wolf D. A. and Vass A. A., Anal. Chem. (1999) 71, 633–641) is used to reduce the limitations found in electron ionization. Because chemical ionization is a softer method than electron ionization, in theory, it should favor the presence of higher mass ions. In practice, chemical ionization combined with methylation yields higher mass fragments (up to m/z 300) but because of the presence of a high pressure plasma in the ion source, that is necessary for the chemical ionization process, other complications are found. The presence of a reagent gas at high pressure creates a high background signal, thus, creating interferences and reducing the sensitivity of the approach.

SUMMARY OF THE INVENTION

According to a first object of the invention, micro-organism or other very high molecular weight micro-objects are analyzed using a physical process rather than a biological process. Thus, an instrument (Bacteria analyzer) has been developed and is provided which allows a fingerprint of micro-organisms to be obtained rapidly (within minutes), thus providing a means for their rapid detection and identification.

According to a broad aspect of the invention, an analyzer for bacteria or other micro-organism-like micro-objects has been developed which uses an “in-beam” pyrolyzer, a metastable atom bombardment ionization source, and a time-of-flight (TOF) mass analyzer to conduct rapid detection and identification of micro-organisms and chemical polymers.

The approach that is described in this application can remedy both types of problems associated with pyrolysis having to be conducted away from the ionization chamber and the ionization process itself being inadequate leading to a loss of information and a complication of the mass spectra obtained during pyrolysis.

The present invention, uses “in-beam” pyrolysis where the sample is pyrolyzed directly in the source (“in-beam”) of the mass spectrometer therefore providing high-mass information from the compound being analyzed. Ions at high mass are much more specific in terms of biomarkers and therefore provide specific information on the identity of the system being under investigation.

The present invention remedies most of the problems described previously by reducing fragmentation, increasing sensitivity and reproducibility and provides means by which high mass markers can be monitored. It also allows fingerprint of the micro-organisms or chemical polymers to be obtained at several precisely known ionization energies which increases the selectivity of the technique. The increase in reproducibility due to the use of quantized energies for ionization allows spectral libraries of micro-organisms to be generated and these are exportable to other laboratories because the excitation energy of the metastable species is not affected by experimental conditions.

According to a first independent aspect of the invention, an analyzer apparatus for high molecular weight species is provided. The apparatus comprises a metastable atom generator, and a pyrolyzer for pyrolysis of a sample of the high molecular weight species, an ionization chamber in communication with the generator and the pyrolyzer. The ionized ones of said species are accelerated by an electric extraction lens device into a mass analyzer.

Preferably, the mass analyzer is a time-of-flight (TOF) analyzer. The metastable atom generator preferably outputs a beam of metastable atoms along an axis extending through the chamber and the lens device into the mass analyzer. The chamber may comprise a conical repeller-deflector having an orifice at its apex through which the metastable atoms pass.

The ion chamber preferably comprises a slit through which pyrolyzed product passes from the pyrolyzer in a direction perpendicular to the beam axis. The beam of metastable atoms is preferably substantially free of ions.

According to a second independent aspect of the invention, there is provided a method of analyzing a micro-organism comprising the steps of preparing a sample of the micro-organism, placing the sample in a pyrolyzer, pyrolyzing the sample with a selected temperature program to provide pyrolyzed product of a high-dalton mass range, ionizing the product using metastable atoms, and analyzing the ionized product using a high acquisition rate mass analyzer. It is preferred that the product is provided directly in an ionization chamber, and that the metastable atoms are provided by a beam traversing the chamber and passing into the analyzer.

BRIEF DESCRIPTION OF THE DRAWINGS

The present invention will be better understood by way of the following detailed description of a preferred embodiment with reference to the appended drawings in which.

DETAILED DESCRIPTION OF THE PREFERRED EMBODIMENT

Figure 1:
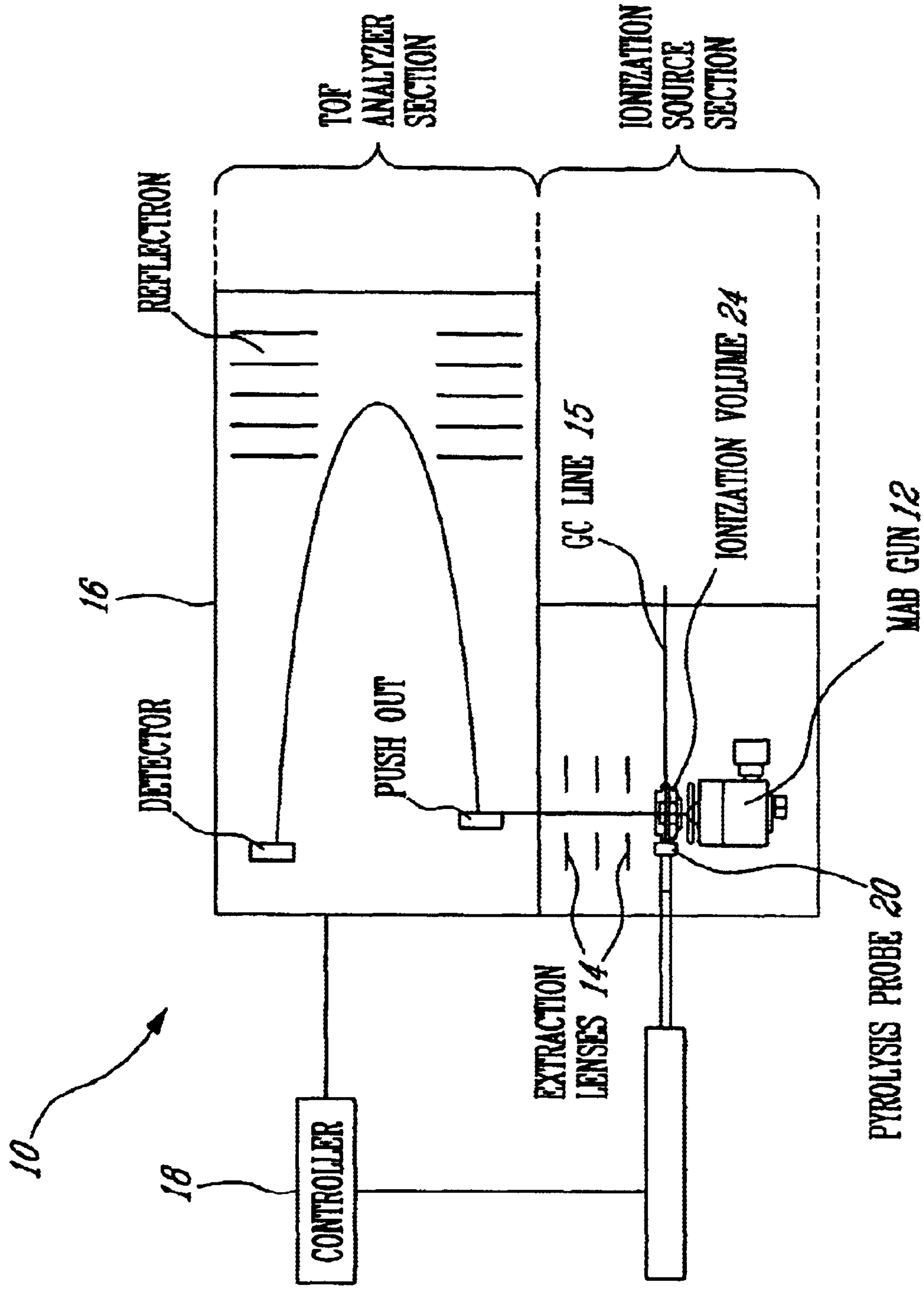
FIG. 1 is a schematic view of the complete apparatus according to the preferred embodiment.

The instrument 10 shown in FIG. 1 has several components: a pyrolyzer 20, a metastable atom bombardment source 12, transfer optics 14 and a time-of-flight mass analyzer 16. A computer control system 18 controls the pyrolyzer 20 and analyzer 16, and also performs data acquisition and data treatment.

A sample (micro-organism or polymer) is inserted into the instrument 10 (under vacuum) using pyrolysis device 20. Usually, after collection from air or from a biological fluid, the sample is deposited as a solution (in a volatile solvent) in a capillary on a probe, on a ribbon or a coiled filament. In the case of many micro-organisms, a volume of 2 to 5 $\mu$L of the micro-organism in ethanol is used. The temperature of the sample is rapidly raised resulting in pyrolysis. The rate of temperature increase can be up to several thousands of degrees C. per second, and typically it is in the range of 500 to 1000° C./s for micro-organisms and slower for polymers. If pyrolysis is conducted directly in the ionization source, as is the case in the preferred embodiment, the decomposition products are immediately ionized. There are several types of pyrolyzers that can be purchased commercially, such as the CDS Pyroprobe™ 1000 or 2000 from CDS Analytical, Inc. of Oxford, Pa. It is preferred that pyrolysis be conducted in the ionization source to avoid that high mass ions will not be detected and identification specificity will be lowered. The pyrolyzer is controlled using the control electronics sold with the CDS Pyroprobe™ which electronics form part of the control system schematically illustrated by block 18.

The metastable atom bombardment source 12 (metastable atom bombardment gun) is known from U.S. Pat. No. 6,124,675. The metastable atom bombardment source comprises a metastable atom gun in which metastable species (atoms or small molecules) are produced, and an ionization volume 24 is provided in which the decomposition products of pyrolysis collide with the metastable atom beam and are instantly ionized. In this specification, the term "metastable atom" includes all metastable species, namely both atoms, typically noble gas atoms and small gas molecules, such as nitrogen, which exhibit suitable properties with respect to becoming excited into a metastable state and then transferring their metastable state energy to other molecules to be ionized. As described in U.S. Pat. No. 6,124,675, this transfer of energy is of a precise quantum and is done with minimal exchange of kinetic energy, thus resulting in ionization with little fragmentation. The source 12 generates a beam of metastable atoms which is substantially free of ions, due to its internal arc being curved with the anode positioned away from the beam axis. Because "in-beam" pyrolysis is conducted within a beam of metastable species, primary products (radicals or molecules) are produced in a cloud of metastable species leading to their ionization. Hence, high molecular weight materials cannot be lost because they are converted to ions that are extracted from the ion volume by an electrical field.

Figure 2:
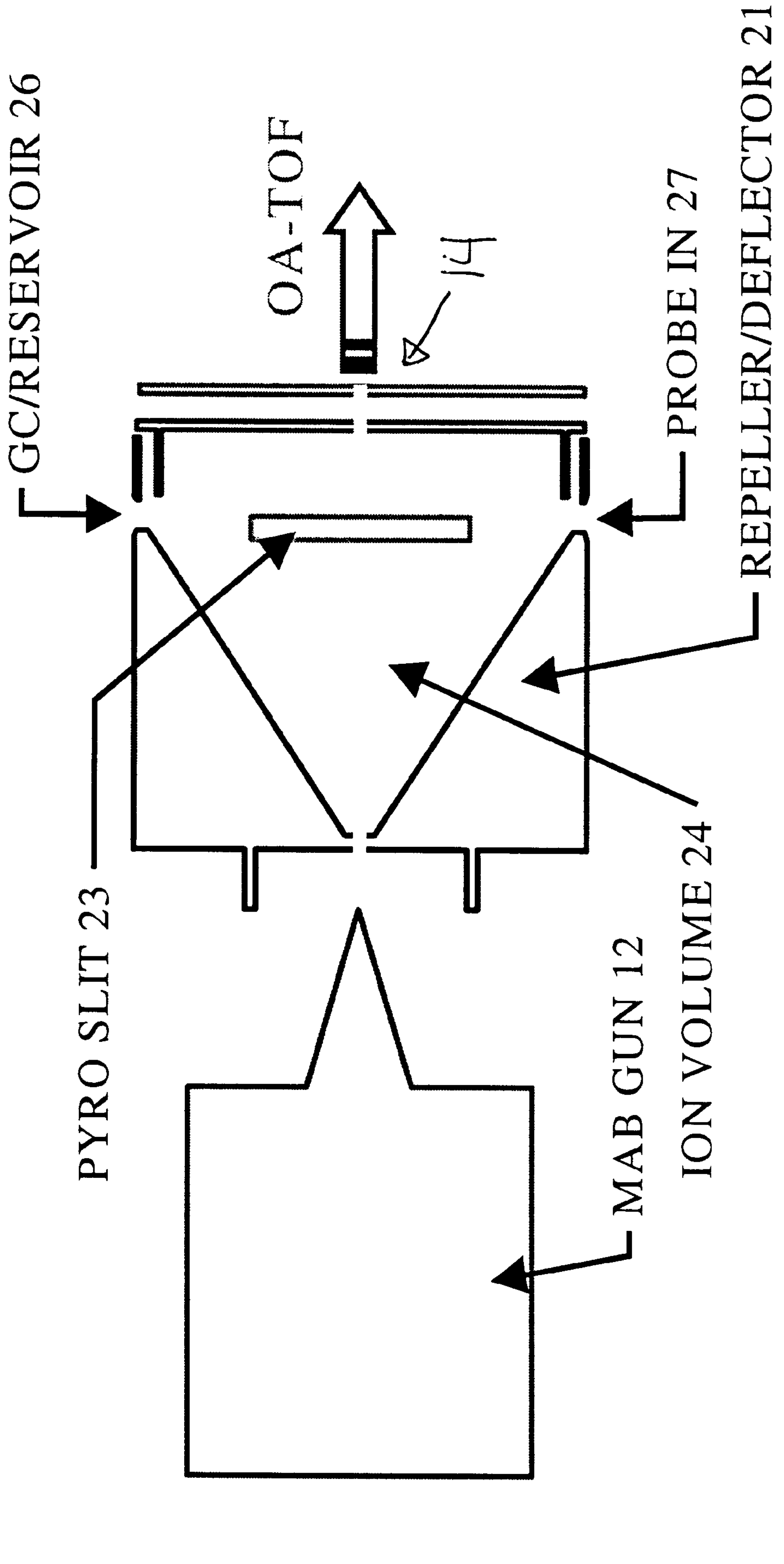
FIG. 2 is a schematic view of the ion source according to the preferred embodiment in which a metastable atom bombardment source provides ionizing metastable atoms or molecules for ionizing pyrolyzed micro-organisms or other micro-objects to be analyzed.
Figure 3:
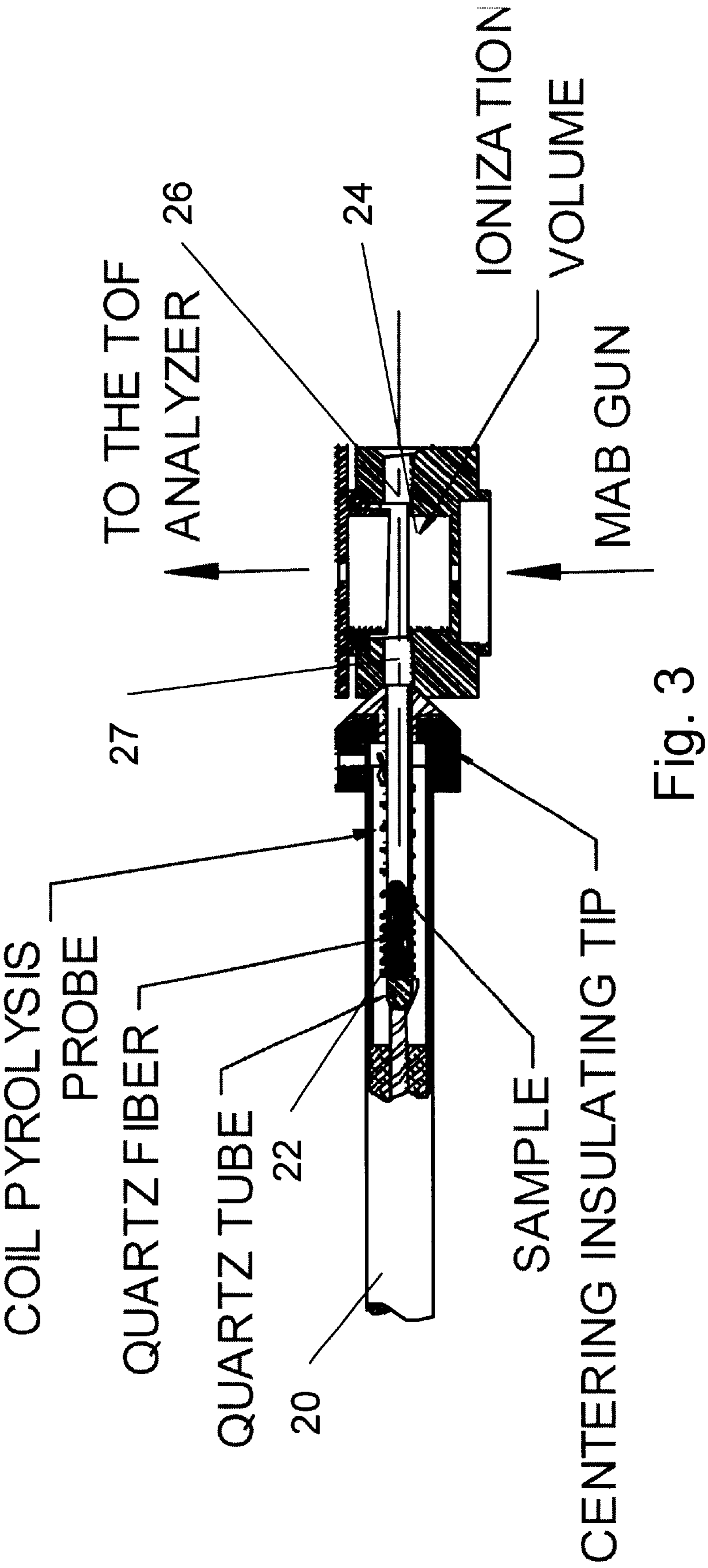
FIG. 3 is a partly sectional detailed side view of the ion volume for the insertion of the pyrolyzer probe.

The metastable atom bombardment source assembly including the ion volume is shown schematically in FIG. 2. The metastable atom gun 12 is located at the back of the ion volume 24 and the beam of metastable species coming out of the gun enters the ion volume 24 through a conical deflector/repeller plate 21 that eliminates charged species from the metastable atom beam while repelling ions formed in ion volume 24 towards the ion extraction optics 14. "In-beam" pyrolysis of the sample can be conducted on a probe element 22 which can comprise a capillary or coiled filament as shown in FIG. 3. High molecular weight molecules of the sample to be analyzed may also be provided by means other than pyrolysis. For example, previously processed samples may be introduced in the ionizing chamber through a GC line 15, as shown in FIG. 1. The probe 20 is inserted through a hole 27 on the side of the ion volume 24 as shown in FIGS. 1 and 3.

Figure 5:
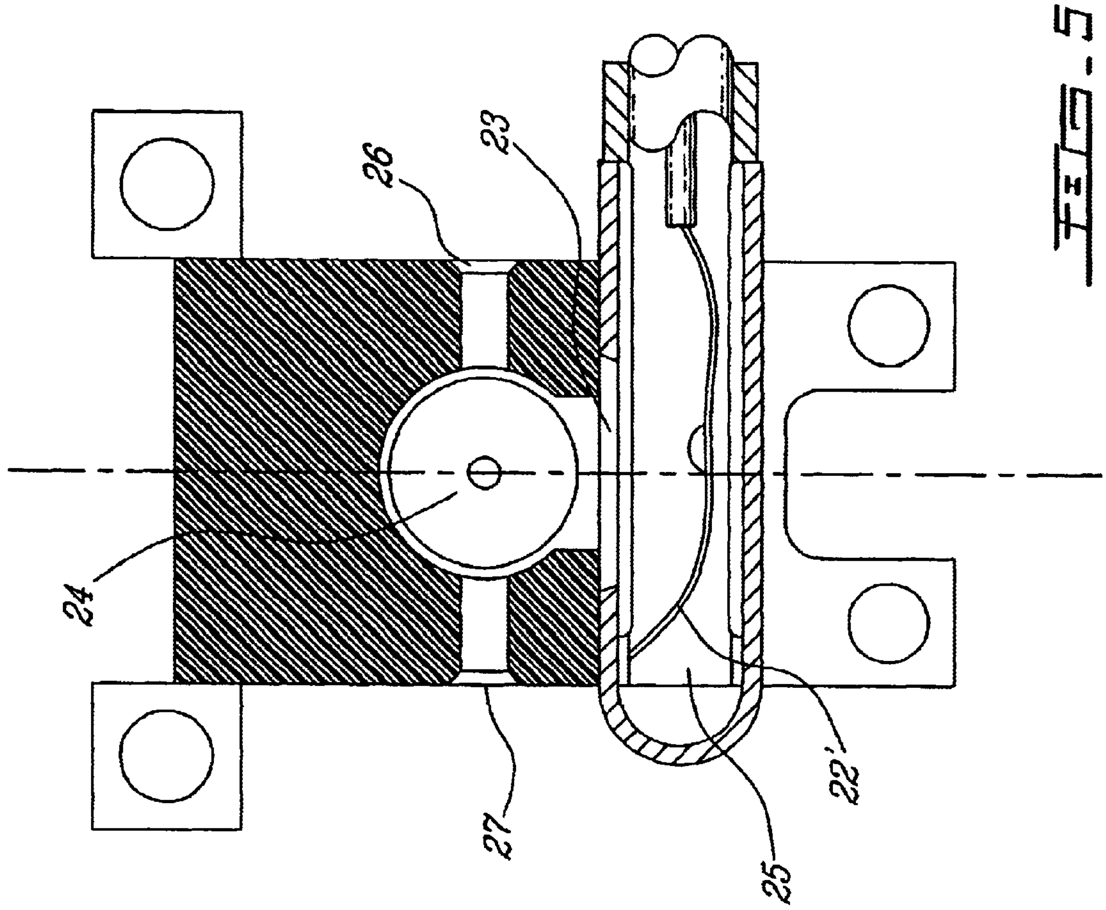
FIG. 5 is a partly sectional detailed axial view of the ion volume illustrating in cross-section the side of the pyrolyzer according to the preferred embodiment.
Figure 4:
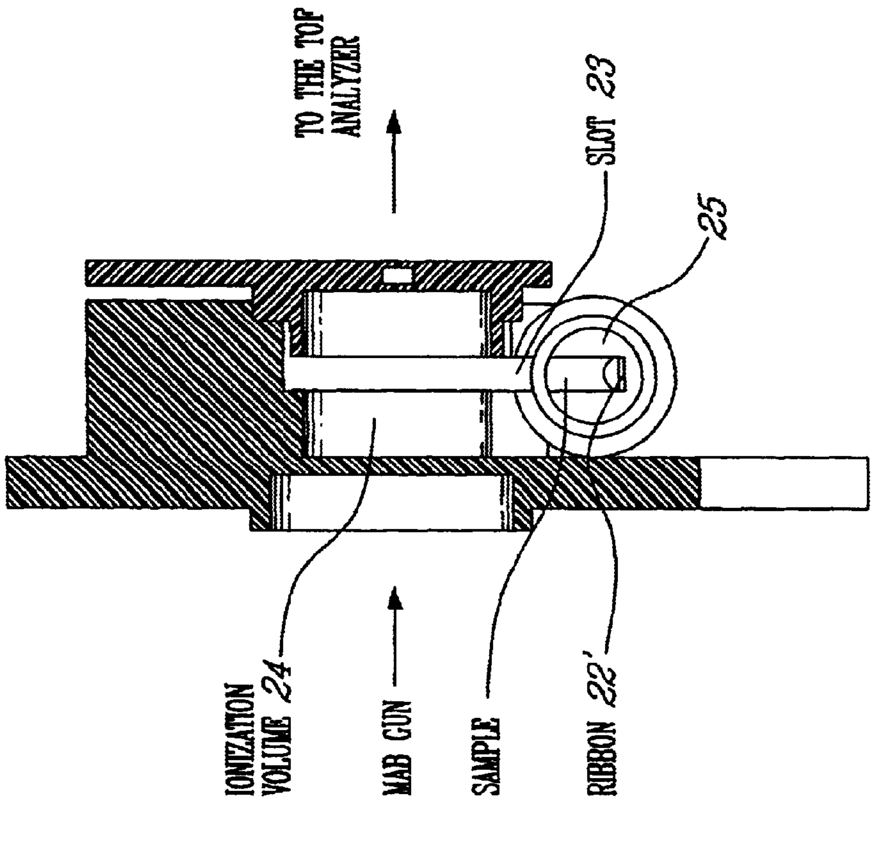
FIG. 4 is a partly sectional detailed side view of the ion volume illustrating the cross-section of the chamber receiving the pyrolyzer and pyrolyzer slit according to the preferred embodiment.

Preferably, the sample can be deposited on a platinum ribbon or boat 22' in a chamber 25 below the ion volume but that connects to the ion volume via the pyro-slit 23, as shown in FIGS. 4 and 5. The later mode of operation is preferred because it can substantially reduce contamination of the ion volume 24 by carbon deposits formed during pyrolysis at high temperature. The tip of the CDS Pyroprobe 2000 pyrolyzer is adapted to fit into the cylindrical chamber 25. As shown in FIGS. 2 and 5, an additional port 26 allows high-molecular weight vapor from a GC or a reservoir to communicate with ion volume 24.

The ions formed by the metastable atom bombardment source in the ion volume are extracted by the extraction optics 14 and transferred into orthogonal acceleration time-of-flight mass analyzer 16. This mass analyzer can be purchased commercially from several sources, such as HD Technologies (Manchester UK), Micromass, etc. The HD TOF analyzer is compact, measuring about 10×20×30 cm and can operate at an acquisition frequency of 100 kHz, using a sample size of 1 picogram with a resolution of 1000 FWHM. Other types of mass analyzers could be used, such as a quadrupole TOF (Q-TOF) or magnetic mass analyzers (MS). However, it is advantageous to use such a TOF mass analyzer because it is sufficiently sensitive and it has the capability of rapid acquisition (100 kHz). Since the pyrolysis step is a rapid phenomenon, it is important to provide real time sampling of the process. Hence, time-resolved pyrograms can be obtained and they yield information that is crucial for the identification of the micro-organism. The use of a slower mass analyzer would result in loss of information because the mass spectra obtained (from which the pyrogram is constructed) will be averaged spectra, thus, distorting the real time information. Thus, the information matrix (time/temperature-mass-intensity) will be deprived of the time/temperature axis. This compression of the time scale produces a loss of information. When the mass analyzer is able to match the time scale of the process (micro seconds for pyrolysis) fine structure can be observed in the pyrogram.

It will be appreciated that the acquisition rate of a TOF analyzer decreases with the size of the particles or molecules to be analyzed. Typically for a mass range of 500 daltons (Da), the acquisition speed will be about 50 kHz, while for a mass range of 1000 Da, the speed will be about 20 kHz. According to the preferred embodiment, acquisition speed in the range of 20 to 50 kHz are used.

The essential characteristics of the bacteria analyzer 10 are the ability to conduct "inbeam" pyrolysis, to ionize using a metastable atom bombardment source assembly and to use a mass analyzer capable of rapid acquisition of mass spectra.

The use of "in-beam" pyrolysis is important in retaining the high mass species generated during pyrolysis. However, it is not a sufficient condition because these species can be destroyed (fragmented) during the ionization process. It is important that the ionization technique used greatly reduce fragmentation, thus, increasing the relative abundance of high mass ions and reducing the complexity of the mass spectra. The metastable atom bombardment ionization process, contrary to other ionization techniques, allows a precise and reproducible control over fragmentation because it uses metastable atoms that are excited with a quantized energy (electronic excitation).

When using rare gases or small molecules, such as $N_2$, it is possible in a metastable atom bombardment source to have precisely known ionization energies in the range of 8–20 eV. The use of Xe (8.32 eV), Kr (9.55 eV) or $N_2$ (8.52 eV) for generating the metastable species will lead to very soft ionization and essentially no fragmentation because the ionization energies of the compounds formed during pyrolysis are of the order of 8 eV. Hence, all the available energy in the metastable species is used for ionization and ions are formed with low internal energies and cannot fragment as in electron ionization. In the case of bacteria, Kr and Ar are preferred. While in some cases, Ar results in better sensitivity, it increases fragmentation. For obtaining a contrast or comparison spectra, He at an energy of 19.82 eV can be used for high energy or Xe for low energy. Nitrogen $N_2$ can also be used to replace Xe or Kr in many cases.

Furthermore, because atoms are used instead of ions as in chemical ionization, the background signal in the mass spectrometer is extremely low, thus, eliminating interfering signals. The overall results are better sensitivity, better reproducibility and simplified mass spectra. Thus it becomes possible to observe high mass ions (biomarkers) and eliminate ions due to secondary fragmentation that have essentially no information content.

Furthermore, it is possible with metastable atom bombardment ionization to obtain pyrograms of the same micro-organism at different precisely known ionization energies. This can be extremely useful in increasing the selectivity of the technique. For example, some micro-organisms can yield very similar fingerprints under given ionization energy conditions. If a single ionization energy is available, as in electron ionization, it becomes difficult if not impossible to distinguish between strains closely related. However, if several precisely known ionization energies can be used, as is the case with metastable atom bombardment ionization, then it is possible to conduct pyrolysis with several ionization energies, thus, generating several fingerprints. Hence, chances that several micro-organisms yields very similar fingerprints at all energies become less probable and the selectivity of the technique is greatly increased.

Figure 6:
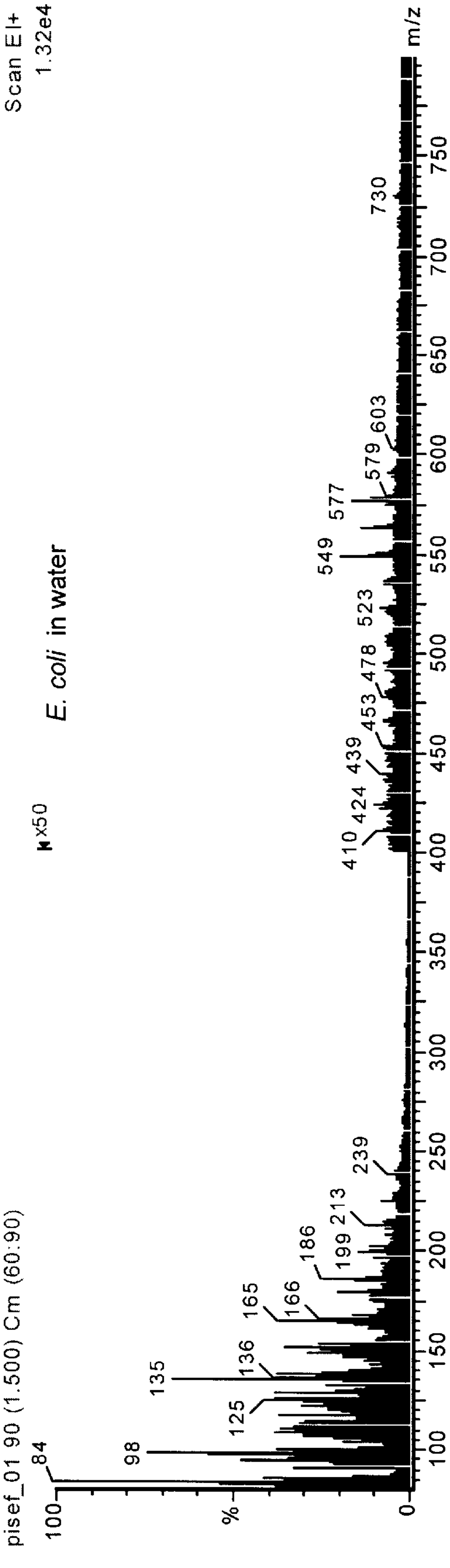
FIG. 6 is a spectrum plot of *E. coli* in water obtained using the apparatus according to the preferred embodiment.
Figure 7:
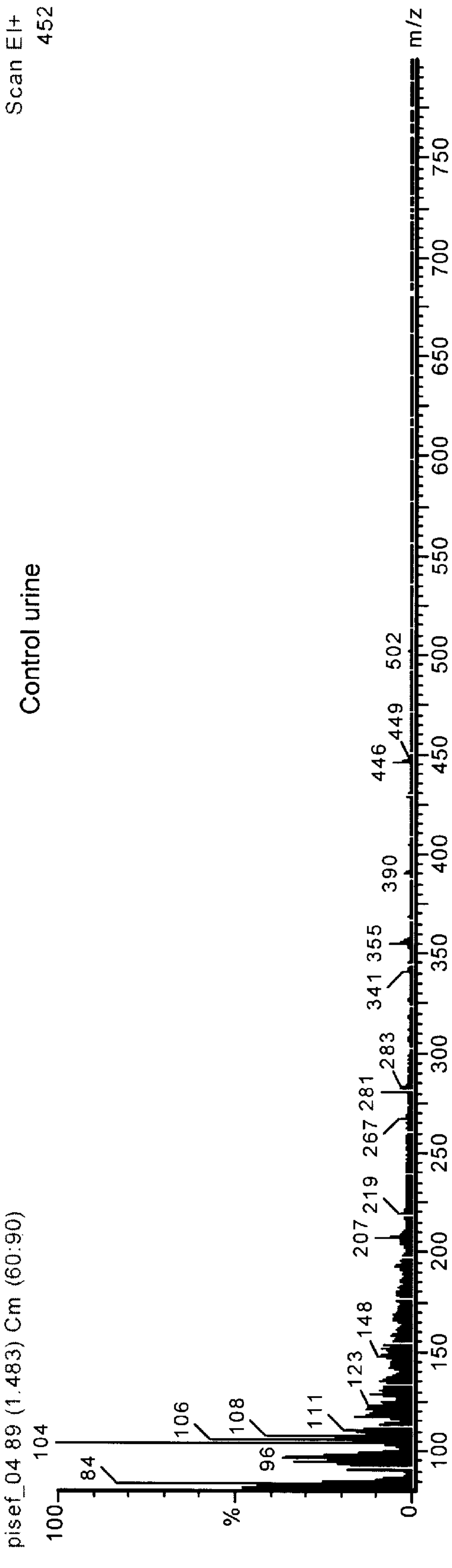
FIG. 7 is a spectrum plot of control urine free of *E. coli* obtained using the apparatus according to the preferred embodiment.
Figure 8:
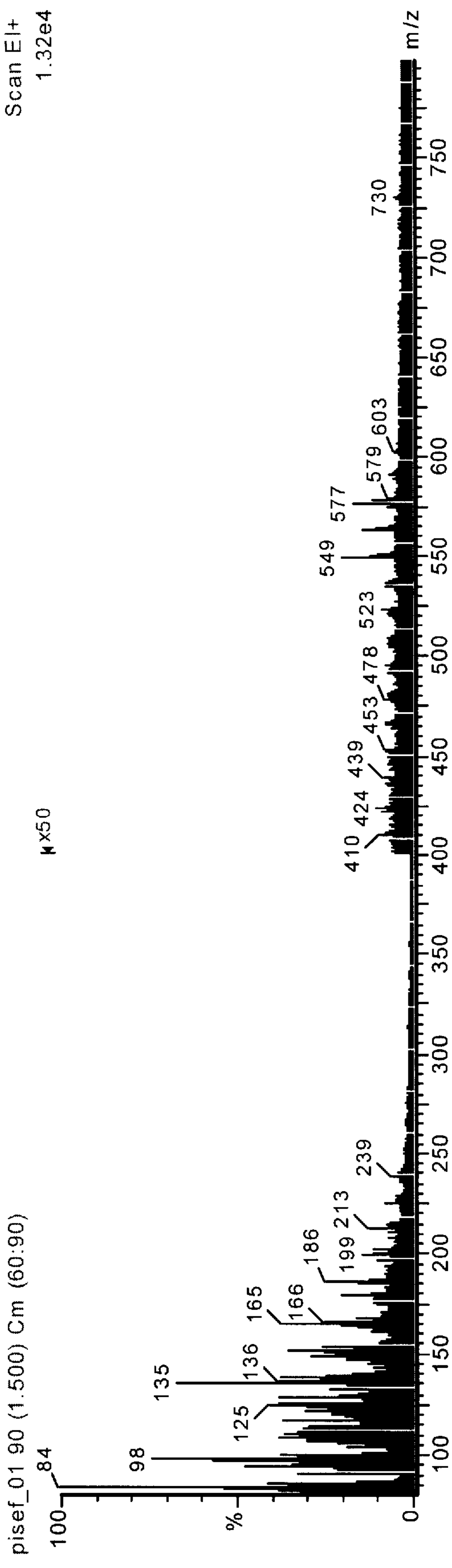
FIG. 8 is a spectrum plot of *E. coli* in human urine obtained using the apparatus according to the preferred embodiment.

The instrument 10 operates on the universal principle that any organic matter can be pyrolyzed giving decomposition products that will be specific of the compound under specific thermal conditions. Thus, it is not restricted in its applications and it can be applied to the identification of biopolymers or chemical polymers. The applications of the techniques are broad because the approach can yield rapid information in many instances where time is of the essence. Results have been obtained using the present invention that allow the identification of bacteria, fungi and GMO's in field and clinical environments, and the sensitivity of the approach has shown to be sufficient in clinical assays, and the control of GMO's in foodstuffs. FIGS. 6 to 8 shows an example of the detection of the bacteria *E. Coli* in urine. The spectrum of FIG. 6 represents that of *E. Coli* in water (taken as reference). The spectrum of FIG. 7 represents that of normal control urine (*E. Coli* free). The spectrum of FIG. 8 represents that of a human urine sample containing *E. Coli.*

What is claimed is:

1. An analyzer apparatus for high molecular weight species, the apparatus comprising:

a metastable atom generator;

a pyrolyzer for pyrolysis of a sample of said high molecular weight species;

an ionization chamber in communication with said generator and said pyrolyzer;

a mass analyzer; and an electric extraction lens device accelerating ionized ones of said species from said chamber into said mass analyzer.

2. The apparatus as claimed in claim 1, wherein said mass analyzer is a time-off-light (TOF) analyzer.

3. The apparatus as claimed in claim 2, wherein said generator outputs a beam of metastable atoms along an axis extending through said chamber and said lens device into said mass analyzer.

4. The apparatus as claimed in claim 1, wherein said generator outputs a beam of metastable atoms along an axis extending through said chamber and said lens device into said mass analyzer.

5. The apparatus as claimed in claim 3, wherein said chamber comprises a conical repeller-deflector having an orifice at its apex through which said metastable atoms pass.

6. The apparatus as claimed in claim 4, wherein said chamber comprises a conical repeller-deflector having an orifice at its apex through which said metastable atoms pass.

7. The apparatus as claimed in claim 3, wherein said chamber comprises a slit through which pyrolyzed product passes from said pyrolyzer in a direction perpendicular to said axis.

8. The apparatus as claimed in claim 4, wherein said chamber comprises a slit through which pyrolyzed product passes from said pyrolyzer in a direction perpendicular to said axis.

9. The apparatus as claimed in claim 5, wherein said chamber comprises a slit through which pyrolyzed product passes from said pyrolyzer in a direction perpendicular to said axis.

10. The apparatus as claimed in claim 6, wherein said chamber comprises a slit through which pyrolyzed product passes from said pyrolyzer in a direction perpendicular to said axis.

11. The apparatus as claimed in claim 1, wherein said generator produces a beam of metastable atoms substantially free of ions.

12. A method of analyzing a micro-organism comprising the steps of:

preparing a sample of the micro-organism;

placing the sample in a pyrolyzer;

pyrolyzing the sample with a selected temperature program to provide pyrolyzed product of a high-dalton mass range;

ionizing said product using metastable atoms; and analyzing said ionized product using a high acquisition rate mass analyzer.

13. The method as claimed in claim 12, wherein said product is provided directly in an ionization chamber.

14. The method as claimed in claim 13, wherein said metastable atoms are provided by a beam traversing said chamber and passing into said analyzer.

15. The method as claimed in claim 14, wherein said beam is substantially free of ions when entering said chamber.

16. The method as claimed in claim 12, wherein said analyzer is a time-of-flight (TOF) mass analyzer.

* * * * *